United States Patent [19]

Morimoto et al.

[11] Patent Number: 5,343,316
[45] Date of Patent: Aug. 30, 1994

[54] PHOSPHOR FOR USE IN A CATHODE-RAY TUBE AND DISPLAY DEVICE USING ONE

[75] Inventors: Kouji Morimoto; Miyuki Sumitomo; Katsunori Uchimura, all of Anan, Japan

[73] Assignee: Nichia Chemical Industries, Ltd., Tokushima, Japan

[21] Appl. No.: 83,269

[22] Filed: Jun. 29, 1993

[30] Foreign Application Priority Data

Jun. 30, 1992 [JP] Japan ................................. 4-197894

[51] Int. Cl.$^5$ ...................... G02F 1/1335; C09K 11/80
[52] U.S. Cl. ................. 359/50; 252/301.4 R; 313/468
[58] Field of Search ................... 252/301.4 R; 359/50; 313/468

[56] References Cited

U.S. PATENT DOCUMENTS

| | | | |
|---|---|---|---|
| 4,469,619 | 9/1984 | Ohno et al. | 252/301.4 R |
| 4,762,639 | 8/1988 | Kasenga et al. | 252/301.4 R |
| 5,202,777 | 4/1993 | Sluzky et al. | 252/301.4 R |

*Primary Examiner*—Jack Cooper
*Attorney, Agent, or Firm*—Nixon & Vanderhye

[57] ABSTRACT

A red-emitting phosphor represented by a general formula $(Y_{1-x-y} Cr_x Gd_y)_3 (Al_{1-z} Ga_z)_5 O_{12}$ with the provide that $0.0005 \leq x \leq 0.05$, $0 \leq y \leq 1$, $0 \leq z \leq 1$, providing red- and infrared emitting luminescence, using alone or in a mixture with other phosphors in a cathode ray tube, having a constant main emission peak even if excited by a high current density, having a satisfactory luminescence efficiency, and causing less brightness saturation in proportion as a current density increases.

15 Claims, 4 Drawing Sheets

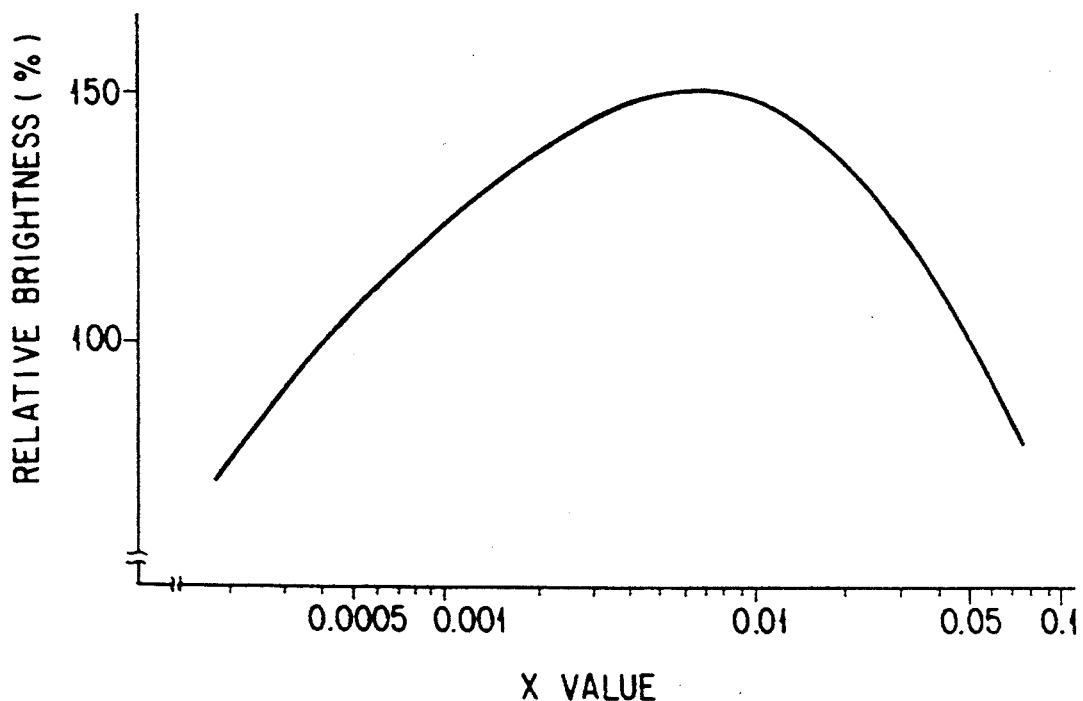
F I G. 2

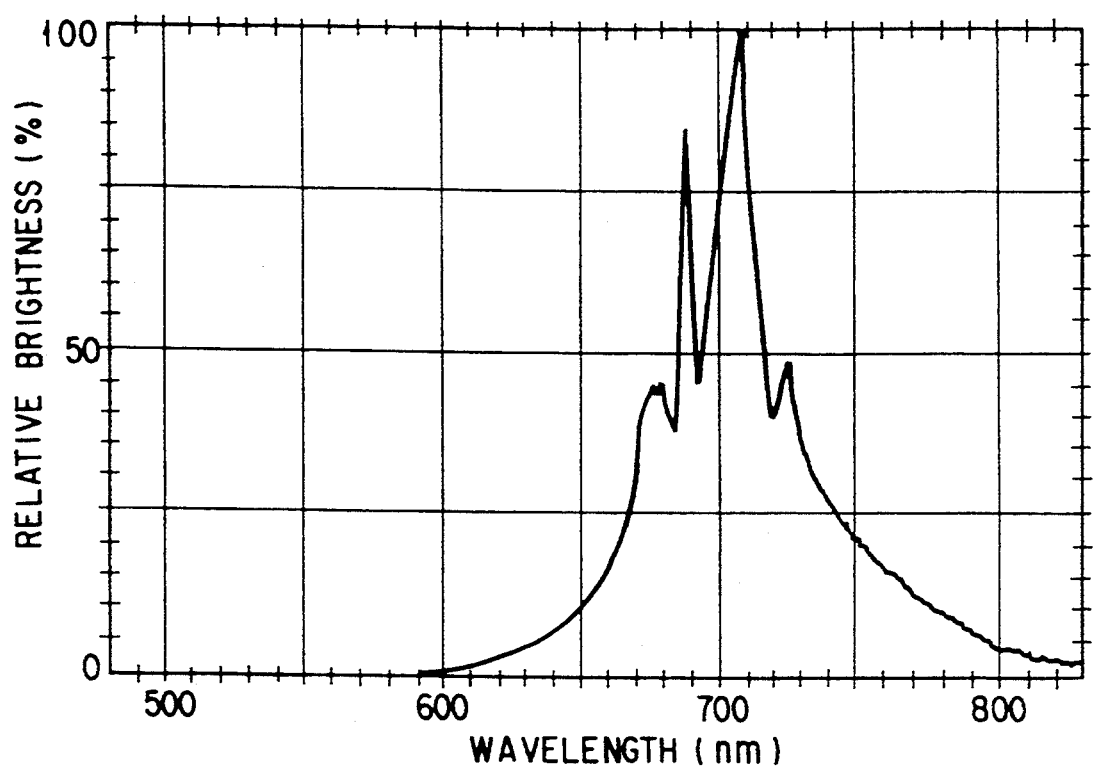
F I G. 3
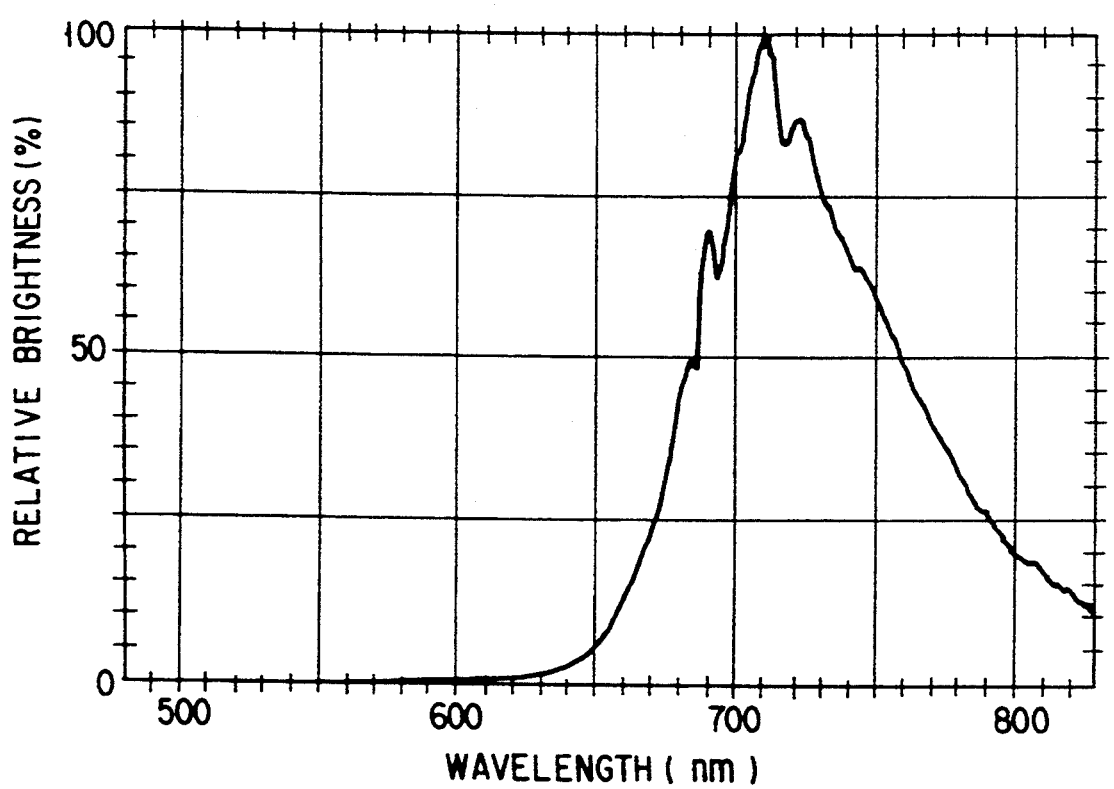
F I G. 4

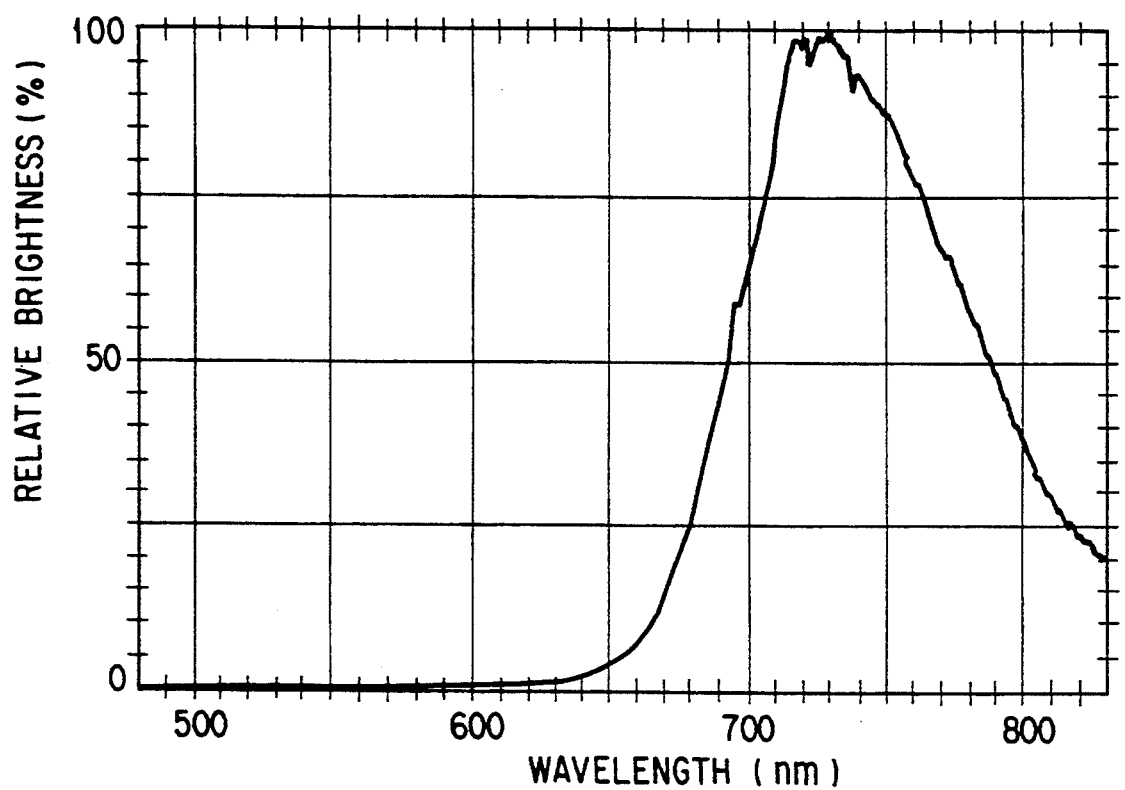
F I G. 5
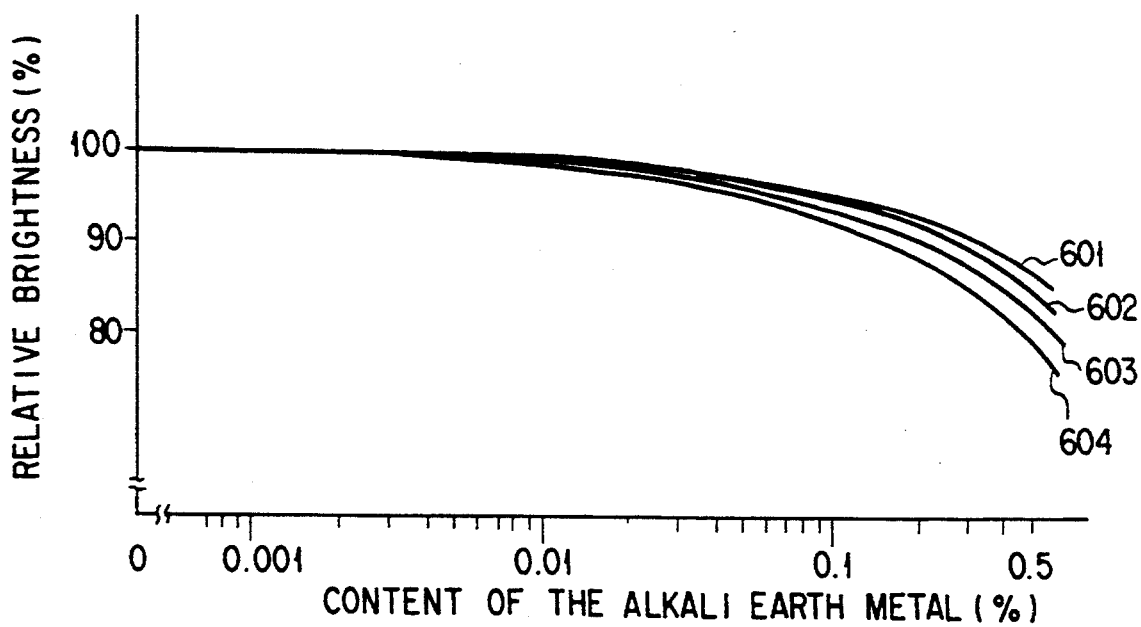
F I G. 6

PHOSPHOR FOR USE IN A CATHODE-RAY TUBE AND DISPLAY DEVICE USING ONE

BACKGROUND OF THE INVENTION

Field of the Invention

The present invention relates to a phosphor for use in a cathode ray tube having a main emission in the wavelength of 650 nm or more and providing mainly an infrared luminescence excited by an electron beam. More particularly, the present invention relates to a phosphor belonging to yttrium aluminum garnet (hereinafter referred to as YAG), gadorinium gallium garnet (hereinafter referred to as GGG), and yttrium gallium garnet (hereinafter referred to as YGG).

Description of the Related Art

A cadmium sulfide phosphor activated by silver (CdS:Ag) is known as a phosphor for use in a cathode ray tube providing a red luminescence in the wavelength of 650 nm or more. The phosphor has a main emission peak and high luminous intensity in the vicinity of 710 to 740 nm, which provides an infrared luminescence but the luminescence efficiency at the wavelength in the vicinity of 610 nm, which provides a red luminescence for a visual use, is low. Due to this characteristic, the CdS:Ag phosphor has not been employed for an ordinary television display as a red-emitting phosphor.

Published Unexamined Japanese Patent Application No. 60-190488 discloses a CdS:Ag phosphor, which can be used in a mixture with other red-emitting phosphors in a cathode ray tube used with a write pen, which provides a feed-back signal from the display to a display control unit. This type of cathode ray tube requires that a trigger signal be provided with certainty as soon as possible the write pen points out the display. This is a significant problem for a red emitting phosphor because luminous intensity of a conventional red emitting phosphor such as a P22R is not sufficient to perform fast response to PIN diode.

A CdS:Ag phosphor has a poor luminescence efficiency in the vicinity of the wavelength of 610 nm, however, the total luminescence efficiency thereof is higher two or more times than that of other phosphors including a P22R phosphor. Furthermore, the CdS:Ag phosphor mixed with a red-emitting phosphor having a main emission wavelength in the vicinity of 610 nm has an advantage that the decrease in the brightness of a red-emitting phosphor layer in a cathode ray tube can be suppressed in an acceptable range and radio-sensitivity thereof can be increased as described in Published Unexamined Japanese Patent Application No. 60-190488.

The CdS:Ag can be also used in a cathode ray tube used in combination with a liquid crystal light valve (hereinafter referred to as LCLV). LCLV comprises a liquid crystal panel and a multi layer composed of a photoconductive layer, a light-shut-off layer, and dielectric mirrors disposed on one of the surfaces of a panel glass. When the multi layer is exposed to a light, the resistance of the light-exposed part of the photoconductive layer reduces and increases the voltage of the liquid crystal layer with the result that the light-exposed part is turned on-state. Exposing a panel to a light is called, in other words, writing on the panel with a light. A cathode ray tube is used as a light source to write on the panel.

The other surface of panel glass is exposed to a polarized light arranged to the same polarization, a reflected light of a turned-on part differs in the polarization angle from that of a turned-off part. The reflected light is passed through a polarized beamsplitter and projected on a screen, thereby to display an image.

In the LCLV, usually a silicon amorphous is used in the photoconductive layer. The silicon amorphous has a light sensitivity to the wavelength range of 650 to 800 nm. The peak of the sensitivity curve is present in the vicinity of 740 nm. Therefore, a CdS:Ag phosphor may be suitable for use in LCLV since the CdS:Ag phosphor provides a luminescence in the same wavelength range as the sensitivity curve of the silicon amorphous.

However, a CdS:Ag phosphor has drawbacks in that a long-time electron excitation is ready to cause deterioration thereof with the result that the brightness of the phosphor decreases and that the emission wavelength is shifted in proportion as a current density increases. The shift of a luminescence spectrum when a CdS:Ag phosphor is excited by various current densities under an acceleration voltage of 18 kv is shown in FIG. 1. The curves 101, 102, 103, and 104 in FIG. 1 show emission wavelengths at the current density of 0.05, 0.5, 5.0, and 50 $\mu$A/cm$^2$, respectively. As is apparent from FIG. 1, a main emission wavelength of a CdS:Ag phosphor shifts to a short wavelength side in proportion as a current density increases. Substantially the same phenomena as the above can be observed when an acceleration voltage increases. From the above described drawbacks, a CdS:Ag phosphor has been considered impractical for a phosphor providing a red-emitting luminescence used in a high current density.

On the other hand, a CdS:Ag phosphor is not preferable to use from the view point of environmental pollution since cadmium contained in the CdS:Ag phosphor is harmful to the environment.

In these days, YAG:Eu, Cr phosphor containing Eu in a content of 1 to 5% and Cr in a content of 0.1 to 1% has been suggested to use for a cathode ray tube to perform writing to LCLV. The luminescence spectrum of the phosphor has two peaks in the vicinity of 700 and 705 nm. This luminescence spectrum is not consistent with the sensitivity curve of silicon amorphous. Due to the inconsistency, not only the total luminescence brightness but also the partial luminescence brightness in the vicinity of 740 nm are not sufficient to be sensed by silicon amorphous.

SUMMARY OF THE INVENTION

The present invention has been developed on the basis of the above circumstances with a view toward providing a red-emitting phosphor having a wavelength of 650 nm or more, causing no shift in an emission spectrum and no deterioration in proportion as a current density or an acceleration voltage increases, and containing no harmful substance; and a display device using the red-emitting phosphor.

The first embodiment of the present invention provides a red-emitting phosphor in the range of a red to an infrared wavelength excited by an electron beam, represented by a general formula $$(Y_{1-x-y} Cr_x Gd_y)_3 (Al_{1-z} Ga_z)_5 O_{12}$$

where $0.0005 \leq x \leq 0.05$, $0 \leq y \leq 1$,
$0 \leq z \leq 1$

The second embodiment of the present invention is provide a cathode ray tube having a phosphor screen containing a phosphor represented by a general formula $(Y_{1-x-y} Cr_x Gd_y)_3 (Al_{1-z} Ga_z)_5 O_{12}$ where
$0.0005 \leq x \leq 0.05$,
$0 \leq y \leq 1$,
$0 \leq z \leq 1$.

The phosphor of the present invention has sufficient luminescence in the wavelength range of 650 to 800 nm, resulting in no shift in wavelength and causing no deterioration even if a current density or an acceleration voltage increases.

A cathode ray tube using the phosphor of the present invention can provide a satisfactory, constant image for a long period of time even if a current density increases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a graph showing the relationship between the Cr content of the phosphor of the present invention and the relative brightness of the phosphor;

FIG. 3 is a graph showing a luminescence spectrum of one of the phosphor of the present invention (YAG);

FIG. 4 is a graph showing a luminescence spectrum of another phosphor of the present invention (YGG);

FIG. 5 is a graph showing a luminescence spectrum of another phosphor of the present invention (GGG);

FIG. 6 is a graph showing the relationship between the alkali earth metal content of the phosphor of the present invention and the relative brightness of the phosphor;

DETAILED DESCRIPTION OF THE PREFERRED EMBODIMENTS

Figure 1:
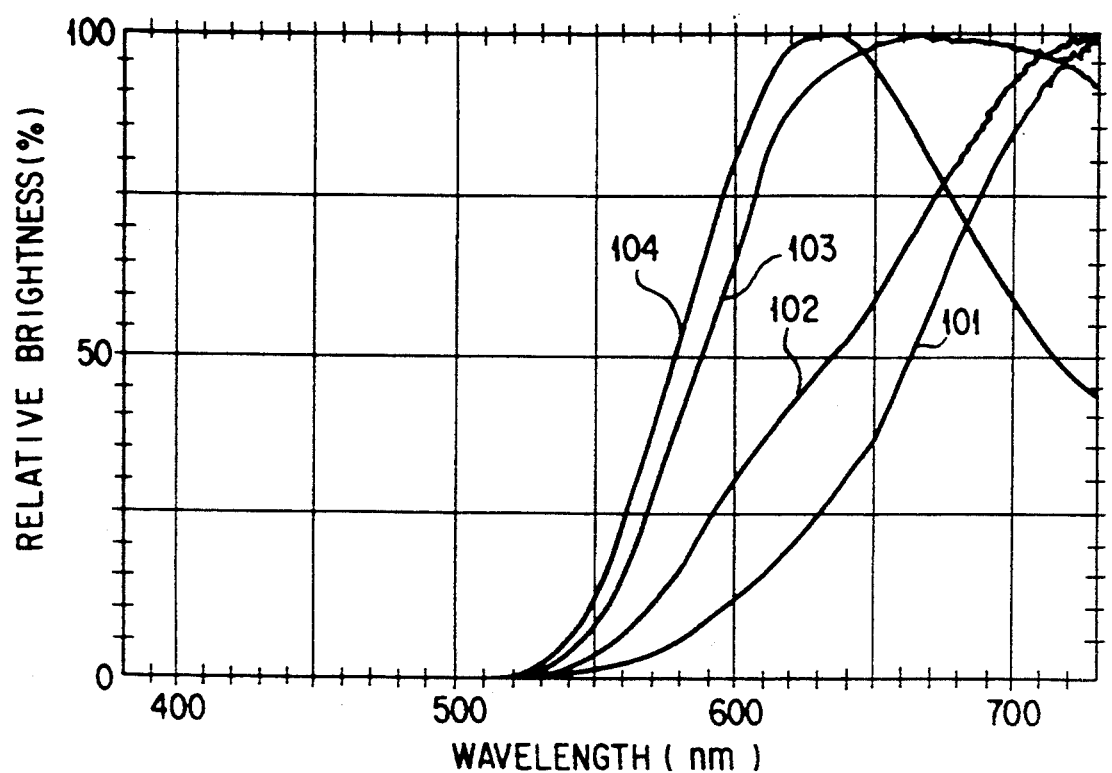
FIG. 1 is a graph showing a luminescence spectrum of the conventional phosphor (CdS:Ag)

The present inventors made intensive and extensive studies on a phosphor containing a matrix which has a main emission at the wavelength of 650 nm or more and does not contain a harmful cadmium and unexpectedly found that the drawbacks accompanying the conventional phosphors can be overcome by application of yttrium and/or gadolinium garnet-type phosphor in which yttrium and/or gadolinium is replaced with a certain amount of chromium. Based on the above-finding, the present invention has been achieved.

According to the first embodiment of the present invention, there is provided a phosphor represented by a general formula $(Y_{1-x-y} Cr_x Gd_y)_3 (Al_{1-z} Ga_z)_5 O_{12}$ where
$0.0005 \leq x \leq 0.05$,
$0 \leq y \leq 1$,
$0 \leq z \leq 1$.

The phosphor has a single-layered garnet structure and a white or light green body color. The single-layered garnet structure can be obtained by the following processes. One of the processes is that oxides of individual elements of the phosphor such as yttrium, gadolinium, aluminum, and chromium are mixed in a predetermined proportion and the mixture is subjected to baking under atmosphere at 1500° C. or more for 20 hours or more.

As another process, hydroxides or chlorides of the above-mentioned elements may be mixed and the mixture may be subjected to baking at 1500° C. or more for 10 hours or more.

Hereinbelow, we will describe features of the phosphor of the present invention.

The phosphor of the present invention is limited to a phosphor having a x value in a range of 0.0005 to 0.05. The relationship between the x value and the relative brightness of the phosphor of the present invention represented by $(Y_{1-x} Cr_x)_3 Al_5 O_{12}$ is shown in FIG. 2. The relative brightness is measured by a process in which the phosphor is spread and coated on a glass plate and excited by a current density of 0.5 μA under an acceleration voltage of 18 kv and the luminescence intensity of a main emission peak at the wavelength of 708 nm is shown in terms of percentages based on that of a CdS:Ag phosphor.

As shown in FIG. 2, the relative brightness of the above mentioned phosphor is superior to the conventional CdS:Ag phosphor when a x value is in a range of 0.0005 to 0.05. The x value is preferably in a range of 0.001 to 0.03, more preferably in a range of 0.003 to 0.015. The relative brightness of the phosphor when a x value is in the range of 0.001 to 0.03 and 0.003 to 0.0015 is 120% or more and 145% or more, respectively.

FIG. 3 shows a luminescence spectrum of a phosphor represented by $(Y_{1-x} Cr_x)_3 Al_5 O_{12}$ wherein x is 0.0065. The phosphor has a main emission peak at the wavelength of approximately 707 nm and providing a luminescence in the wavelength range of 650 to 800 nm. The half band width of the peak is approximately 35 mm. This feature is suitable for use in a photoconductor using silicon amorphous. Unlike in a CdS:Ag phosphor, an emission peak in the above-mentioned phosphor does not shift due to deterioration caused by not only high current density excitation but also replacing of Y with Cr. However, when the phosphor contains YAP having a perovskite structure not only YAG single phase, another emission peak is appeared at the wavelength of approximately 750 nm.

In order to obtain a desired red luminescence, either a part of Y or the total Y can be replaced with Gd and a part of AZ can be replaced by Ga within a certain range of content. This replacement does not affect features of the phosphor having stability of the emission peak in a high current density.

Each molar ratio y of Gd and z of Ga is in the range of 0 to 1. Each value y and z is preferably 0 or 1. If the value y is in excess of 0 or less than 1, the brightness tends to decrease, there is the same tendency for the value z.

As examples, the luminescence spectra of the phosphor represented by general formulae $(Y_{1-x} Cr_x)_3 Ga_5 O_{12}$ and $(Gd_{1-x} Cr_x)_3 Ga_5 O_{12}$ are shown in FIGS. 4 and 5 respectively. Both phosphors show main emission peaks in the vicinity of 707 to 730 nm and provides luminescence in the wavelength range of 650 nm to 800 nm. The half band width of the emission peaks are approximately 75 nm and 110 nm, respectively. The relationship between the x value and the brightness of the phosphor is substantially the same as that shown in FIG. 2.

The half band width of the main peak in the luminescence spectra is preferably 35 nm or more, more preferably 35 to 110 nm.

The phosphor of the present invention contains at least one additive selected from a group consisting of preferably Ba, Sr, Mg, and Ca in a content of 10 ppm to 0.5% based on the total amount of the phosphor.

In the phosphor containing the above additive, a $\gamma$ property that the brightness of the phosphor is increased in proportion as a current density increases can be improved. Even if an alkali earth metal is added in a content more than 0.5% to prevent phosphor, no more improvement cannot be attained to improve the $\gamma$ property. On the contrary, the alkali earth metal exceeding 0.5% works against expectation with the result that the brightness thereof is apt to decrease.

FIG. 6 is a graph showing the relationship between the content of alkali earth metal and the relative brightness of a phosphor. The relative brightness is measured in terms of percentages based on the brightness of the phosphor of the present invention containing no alkali earth metal. In FIGS. 6, 601, 602, 603, and 604 is a graph of a phosphor containing Ba, St, Mg, and Ca. As is apparent from FIG. 6, when an alkali earth metal is added in a content of more than 0.5%, the relative brightness decreases to around 80%. However, a phosphor having the relative brightness less than 80% may not be subjected to a practical use. Therefore, the content of the alkali earth metal is preferably 0.5% or less. Since the phosphor containing Ba shows the least decrease of the relative brightness as shown in FIG. 6, Ba is considered the most preferable additive.

There is another drawback in a phosphor containing an additive more than 0.5%. That is, the alkali earth metal doped in a phosphor is come out by electron beam excitation and attached to an electron gun with the result that the cathode ray tube is ready to be damaged.

An alkali earth metal is introduced into a phosphor by use of a flux made of a halogen compound of the alkali earth metal. Therefore the minimum amount of an alkali earth metal is restricted by the minimum amount of the halogen compound sufficient to work as a flux.

For example, an alkali earth metal can be doped in a phosphor by adding it together with a halogen compound to a phosphor raw material at the time of baking. Since an alkali earth metal halide functions as a flux and assists baking of the phosphor, the baking can be carried out at low temperature. In order to prevent vaporization of the alkali earth metal halide at the time of baking at 1400° C. or more, the baking should be carried out in an air-tight container. The alkali earth metal halide failed in being doped in a phosphor and attached on the surface of the phosphor can be removed by acid washing when a phosphor with an alkali earth metal oxide attached on the surface thereof is used in a cathode ray tube, a vacuum condition of a cathode ray tube may be affected and the attached alkali earth metal oxide is vaporized by electron beam excitation resulting in attaching to an electron gun.

The content of alkali earth metal halide to be added to a phosphor is adjusted usually to 0.5 to 20% based on a phosphor raw material. An alkali earth metal halide added to a phosphor in a content of less than 0.5%, is not effective as a flux. When an alkali earth metal halide is added in a content of 0.5%, a final content of an alkali earth metal halide becomes approximately 10 ppm as a result of subtracting the amount removed by acid washing. Therefore, the content of an alkali earth metal halide is preferably 10 ppm to 0.5%. More preferably, the content of the alkali earth metal halide is 50 ppm to 0.1% in consideration of brightness and $\gamma$ property.

In the phosphor of the present invention, afterglow of the phosphor can be adjusted by changing the proportion of Y and/or Gd to AZ, Or Y and/or Gd to Cr. For example, afterglow can last longer by increasing a content of Al relative to that of Y and/or Gd in the former case, and a content of Cr relative to Y and/or Gd in the latter case. Accordingly, the present invention is advantageous in that the time period of afterglow can be desirably adjusted by changing the proportion of Al or Cr to Y and/or Gd.

In short, the phosphor of the present invention has a constant emission peak even if excited under a high current density and the brightness thereof rises in proportion as the current density increases. When used in a cathode ray tube for projection, the phosphor can provide a long life and a good brightness to the cathode ray tube. As compared to a cathode ray tube using a conventional phosphor, the cathode ray tube of the present invention can maintain the feature of the phosphor for a long time without phosphor deterioration. Further, the phosphor of the present invention can be used alone or in a mixture with other red-emitting phosphors for a cathode ray tube.

According to the second embodiment of the present invention, there is provided a cathode ray tube having a phosphor screen containing a phosphor represented by the general formula $(Y_{1-x-y} Cr_x Gd_y)_3 (Al_{1-z} Ga_z)_5 O_{12}$ with the proviso that $0.0005 \leq x \leq 0.05$, $0 \leq Sy \leq 1$, $0 \leq z \leq 1$.

Figure 7:
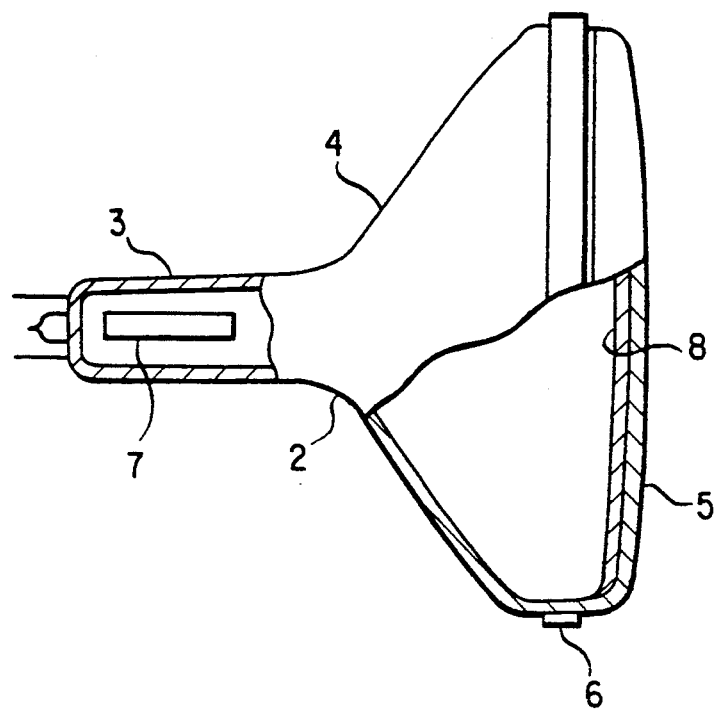
FIG. 7 is a partial cutaway view of the cathode ray tube of the present invention.

An embodiment of a cathode ray tube using the phosphor according to the present invention is shown in FIG. 7. As shown in FIG. 7, a cathode ray tube 1 has an air-tight vacuum envelope 2 made of a vacuum glass bulb. The vacuum envelop 2 consisted of a neck 3 and a cone 4 in one united body. The envelop 2 has a faceplate 5 hermetically attached to the cone 4 by means of fret glass. An explosion-proof metallic tension band 6 is wound around the side wall of the faceplate 5. An electron gun 7 for emitting an electron beam is disposed in the neck 3. A phosphor 8 is formed on the inner surface of the faceplate 5. The phosphor screen 8 is formed on the inner surface of the faceplate 65. The phosphor screen 8 comprises predetermined-shaped phosphor layers which comprises phosphors represented by a general formula $(Y_{1-x-y} Cr_x Gd_y)_3 (Al_{1-z} Ga_z)_5 O_{12}$. A deflecting device (not shown) is mounted on the outside of the cone 4. The deflecting device deflects the electron beam so as to scan the phosphor screen 8.

In this cathode ray tube, the phosphor used on the phosphor screen has a high luminescence efficiency, and a constant quality in spite of a long time usage and a constant luminescence spectrum of the phosphor can be maintained even if a current density or an accelerate voltage increases.

Figure 8:
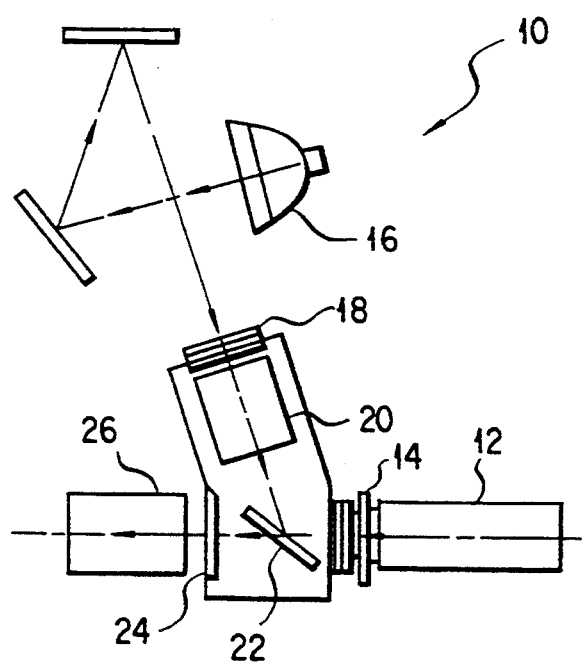
FIG. 8 is a schematic view of a liquid crystal light valve provided with a cathode ray tube.

The cathode ray tube of the present invention can be used as a LCLV CRT by attaching a liquid crystal light valve thereto. The schematic diagram of the LCLV CRT is shown in FIG. 8, wherein a LCLV CRT 10 comprises a cathode ray tube (CRT) 12, which provides an input image which is coupled to a LCLV 14, typically through a fused fiber optic faceplate (not shown). A xenon arc lamp 16 provides the output light, which is filtered by Uv filter 18 and linearly polarized by prepolarizer filter 20 before reaching the liquid crystal light valve 14. The image then passes through a polarizing mirror 22, a prism wedged window 24, and then through a projection lens 26, where it is projected onto a screen (not shown).

The LCLV employs a hydrogenated amorphous silicon photoconductor.

The inner surface of the faceplate is coated with the phosphor according to the present invention to form a phosphor screen (not shown).

Preferably the phosphor used for a LCLV provides a luminescence in the wavelength of 650 to 800 nm, the main peak of the luminescence represents in the wavelength of 707 to 730 nm.

A good image, which is not changed with time, can be obtained by this LCLV CRT since a luminescence wavelength is constant and the quality of the phosphor remains constant and provide a luminescence in the wavelength range of 650 to 800 nm even if a current density or acceleration voltage increases. This CRT can be sufficiently used as a light source for writing, emitting light from the CRT can improve the speed of response at photoconductor layer of the LCLV and the resolution thereof.

Hereinafter, the phosphor of the present invention will be described in detail.

EXAMPLE 1

200g of $Y_2O_3$, 150.4g of $Al_2O_3$ and 0,177g of $Cr_2O_3$ were mixed well, placed in an aluminum container, covered with a lid and baked at 1,800° C for 30 hours. After a completion of the baking, a baked phosphor was taken out and pulverized by means of a ball mill. After pulverizing, the phosphor was washed well with water and dried, thereby obtaining a phosphor represented by $(Y_{0.9987} Cr_{0.0013})_3 Al_5 O_{12}$.

EXAMPLE 2

Substantially the same procedure was employed as in Example 1 except that 200g of $Y_2O_3$, 150.4g of $Al_2O_3$ and 0,885g of $Cr_2O_3$ were used, thereby obtaining $(Y_{0.9935} Cr_{0.0065})_3 Al_5O_{12}$.

EXAMPLE 3

Substantially the same procedure was employed as in Example 1 except that 200g of $Y_2O_3$, 150.4g of $Al_2O_3$ and 1.15g of $Cr_2O_3$ were used, thereby obtaining $(Y_{0.9915} Cr_{0.0085})_3 Al_5 O_{12}$.

EXAMPLE 4

200g of $Y_2O_3$, 150.4 g of $Al_2O_3$, 1.15 g of $Cr_2O_3$, and 14g of $BaF_2$ were mixed well, placed in an aluminum container, covered with a lid and the space between the container and the lid was sealed with a ceramic adhesive, and then baked at 1,450° C. for 3 hours. After a completion of the baking, a baked phosphor was taken out and pulverized by means of a ball mill. After pulverizing, the phosphor was washed with 10% nitric acid to remove a flux remained on the surface of the phosphor, followed by washing well with water and dried, thereby obtaining a phosphor represented by $(Y_{0.9915} Cr_{0.0085})_3 Al_5 O_{12}$. The obtained phosphor was dissolved in an acid solution and a content of Ba remained in the phosphor was measured by means of ICP-AES. As a result, the content of Ba in the phosphor was 250 ppm.

EXAMPLE 5

Substantially the same procedure was employed as in Example 4 except that 200g of $Y_2O_3$, 150.4g of $Al_2O_3$, 1.15g of $Cr_2O_3$, 2g of $MgCl_2$, and 14g of $BaF_2$ were used, thereby obtaining a phosphor represented by $(Y_{0.9915} Cr_{0.0085})_3 Al_5 O_{12}$ containing 200 ppm Mg, 250 ppm Ba.

EXAMPLE 6

Substantially the same procedure was employed as in Example 4 except that 200g of $Y_2O_3$, 285.2g of $Ga_2O_3$, 1.36g of $Cr_2O_3$, 14g of $BaF_2$, and 1.8g of $NH_4Cl$ were used and baked at 1375° C. for 3 hours, thereby obtaining a phosphor represented by $(Y_{0.9900} Cr_{0.0100})_3 Ga_5O_{12}$ containing 250 ppm Ba.

EXAMPLE 7

Substantially the same procedure was employed as in Example 6 except that 108.7 of $Gd_2O_3$, 93.7g of $Ga_2O_3$, 1.6g of $Cr(NO_3)_3.9H_2O$, 3.0g of $MgF_2$, and 0.5g of $NH_4Cl$ were used, thereby obtaining a phosphor represented by $(Gd_{0.9933} Cr_{0.0067})_3 Ga_5 O_{12}$ containing 250 ppm Mg.

EXAMPLE 8

Substantially the same procedure was employed as in Example 6 except that 200g of $Gd_2O_3$, 177.7g of $Ga_2O_3$, 0.85g of $Cr_2O_3$, 7.0g of $SrF_2$, 7.0g of $CaF_2$, and 1.8 g of $NH_4Cl$ were used, thereby obtaining a phosphor represented by $(Gd_{0.9900} Cr_{0.0100})_3 Ga_5O_{12}$ containing 180 ppm Sr and 180 ppm Ca.

The phosphors obtained in Examples 1 to 8 were spread onto glass plates to form luminescence membranes. The physical properties of the phosphors were measured in the following procedures. The results are shown in Table 1.

(1) Deterioration of phosphor caused by an electron beam

The above-obtained phosphor membrane is excited in a continuous manner by a current density of 50 $\mu NA/cm^2$ under an acceleration voltage of 27 kv for one hour and the brightness maintaining rate is measured.

(2) γ property

A phosphor membrane is excited by a current density of 0.05, 0.5, 5, and 50 $\mu A/cm^2$, respectively under an acceleration voltage of 27 kV. The relative brightness is shown in terms of percentages on the basis of the brightness excited by 0.05 $\mu A/cm^2$.

(3) Afterglow

The above-obtained phosphor membrane is excited by 0.5 $\mu A/cm^2$ under an acceleration voltage of 10 kV. After termination of the excitation, the period of time in which the brightness decreases to 10% is measured. The afterglow is shown by mili second.

TABLE 1

| Example | Deterioration (%) | γ property | | | | Afterglow |
|---|---|---|---|---|---|---|
| | | 0.05 | 0.5 | 5.0 | 50 | |
| 1 | 98.1 | 100 | 113.6 | 147.2 | 171.5 | 6 |
| 2 | 98.3 | 100 | 116.8 | 152.3 | 180.5 | 18 |
| 3 | 98.0 | 100 | 117.2 | 153.7 | 183.2 | 72 |
| 4 | 99.2 | 100 | 130.3 | 162.4 | 198.3 | 72 |
| 5 | 99.0 | 100 | 132.6 | 165.5 | 200.7 | 72 |
| 6 | 97.1 | 100 | 119.7 | 162.2 | 240.8 | 8 |
| 7 | 96.9 | 100 | 117.1 | 164.0 | 260.9 | 8 |
| 8 | 96.0 | 100 | 121.2 | 169.7 | 270.9 | 15 |

No shift in a main emission wavelength was observed in the above-shown phosphors in proportion as an acceleration voltage and a current density increases.

Additional advantages and modifications will readily occur to those skilled in the art. Therefore, the invention in its broader aspects is not limited to the specific details, representative devices, and materials shown and described herein. Accordingly, various modifications may be made without departing from the spirit or scope of the general inventive concept as defined by the appended claims and their equivalents.

What is claimed is:

1. A red and infrared-emitting phosphor represented by the formula:

$$(Y_{1-x-y}Cr_xGd_y)_3(Al_{1-z}Ga_z)_5O_{12}$$

where
$0.0005 \leq x \leq 0.05$,
$0 \leq y \leq 1$, and
$0 \leq x \leq 1$,
and containing at least one alkali earth metal selected from a group consisting of Ba, Sr, Mg and Ca in an amount of 10 ppm to 0.5% on the basis of the total amount of said phosphor and exhibiting a larger increase in brightness with an increase in current density excitation than said phosphor absent said alkali earth metal.

2. The phosphor according to claim 1, wherein said x is in the range of 0.003 to 0.015.

3. The phosphor according to claim 1, wherein said y is 0 or 1.

4. The phosphor according to claim 1, wherein said z is 0 or 1.

5. The phosphor according to claim 1, wherein said at least one alkali earth metal is Ba.

6. The phosphor according to claim 1, providing luminescence in the wavelength range of 650 to 800 nm and having a main emission peak in the range of 707 to 730.

7. A cathode ray tube having a phosphor screen containing a red and infraredemitting phosphor represented by the formula:

$$(Y_{1-x-y}Cr_xGd_y)_3(Al_{1-z}Ga_z)_5O_{12}$$

where
$0.0005 \leq x \leq 0.05$;
$0 \leq y \leq 1$, and
$0 \leq z \leq 1$,
and containing at least one alkali earth metal selected from a group consisting of Ba, Sr, Mg and Ca in an amount of 10 ppm to 0.5% on the basis of the total amount of said phosphor, and exhibiting a larger increase in brightness with an increase in current density excitation than said phosphor absent said alkali earth metal 8. The cathode ray tube according to claim 7, wherein said x is in the range of 0.003 to 0.015.

9. The cathode ray tube according to claim 7, wherein said y is 0 or 1.

10. The cathode ray tube according to claim 7, wherein said z is 0 or 1.

11. The cathode ray tube according to claim 7, wherein said at least one alkali earth metal is Ba.

12. The cathode ray tube according to claim 7 wherein said phosphor provides luminescence in the wavelength range of 650 to 800 nm and having a main emission peak in the range of 707 to 730.

13. A liquid crystal light valve CRT comprising:
a liquid crystal light valve including a photosensitive layer consisting essentially of a hydrogenated α-silicon photoconductor, and
a cathode ray tube having a phosphor screen containing a red and infrared-emitting phosphor represented by the formula:

$$(Y_{1-x-y}Cr_xGd_y)_3(Al_{1-z}Ga_z)_5O_{12}$$

where,
$0.0005 \leq x \leq 0.05$,
$0 \leq y \leq 1$, and
$0 \leq z \leq 1$,
and containing at least one alkali earth metal selected from a group consisting of Ba, Sr, Mg and Ca in an amount of 10 ppm to 0.5% on the basis of the total amount of said phosphor, and exhibiting a larger increase in brightness with an increase in current density excitation than said phosphor absent said alkali earth metal.

14. The liquid crystal light valve CRT according to claim 13, wherein said at least one alkali earth metal is Ba.

15. The liquid crystal light valve CRT according to claim 13 wherein said phosphor provides luminescence in the wavelength range of 650 to 800 nm and having a main emission peak in the range of 707 to 730.

* * * * *